Figure 1:
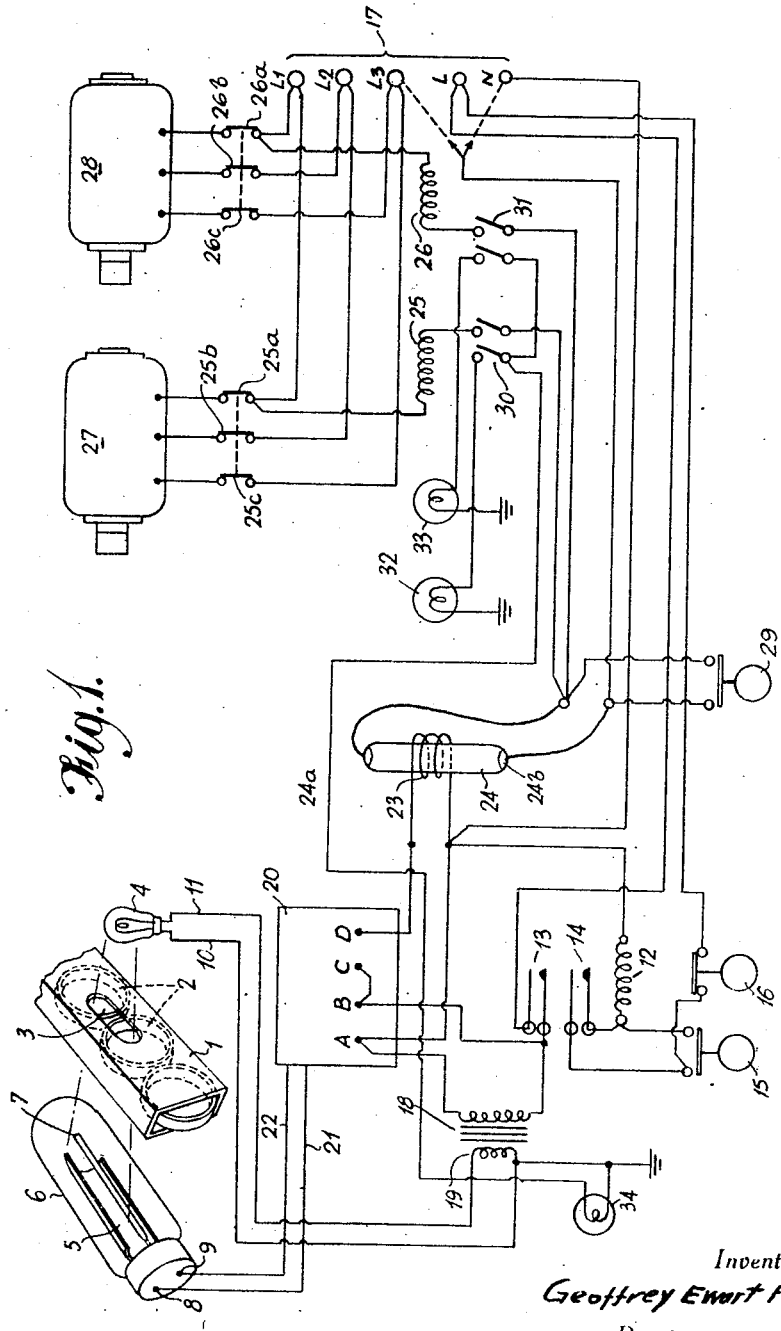

Inventor
Geoffrey Ewart Ford
By O'Boyle & Blair
Attorneys

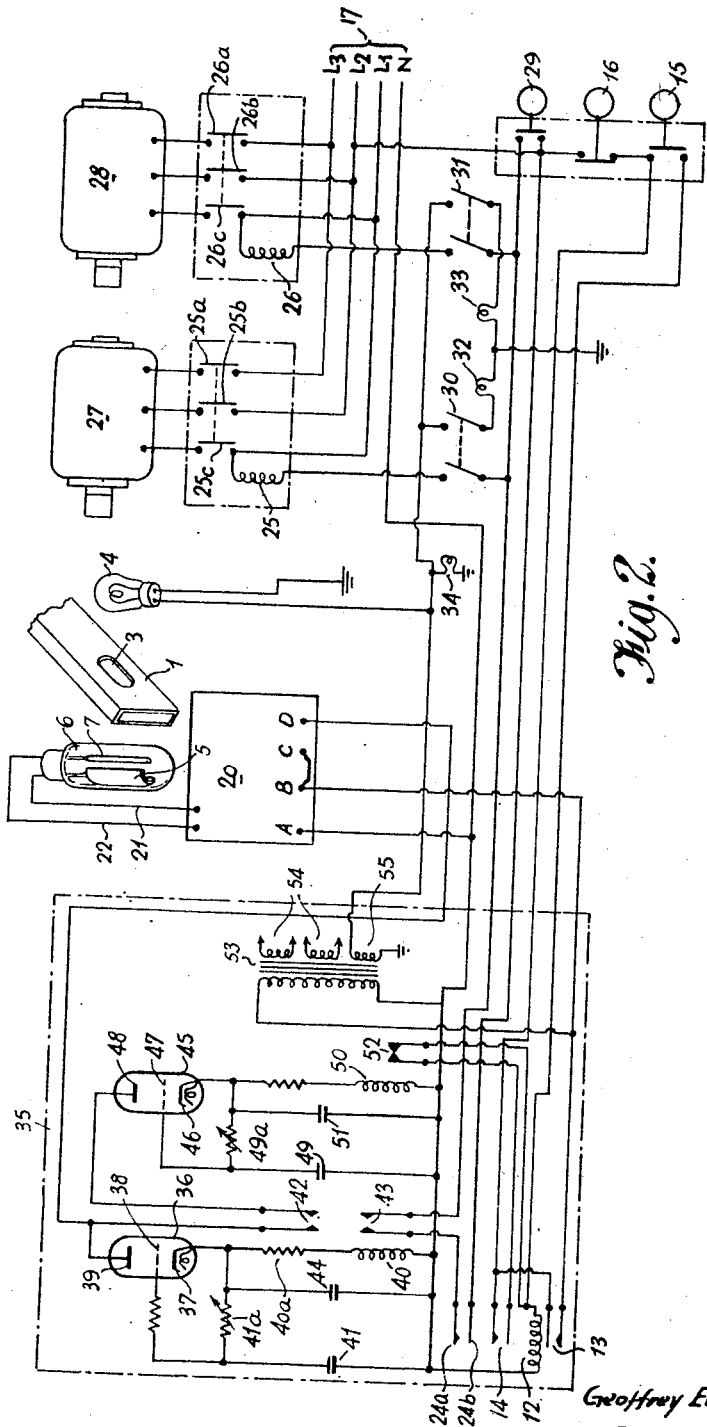

United States Patent Office 2,811,126
Patented Oct. 29, 1957

2,811,126
CONTROL DEVICE FOR CAP FORMING APPARATUS

Geoffrey Ewart Ford, Bedford, England, assignor to Fords (Finsbury) Limited, Bedford, England, a British company Application November 26, 1951, Serial No. 258,186

13 Claims. (Cl. 113—114)

In bottle capping machines, for example in machines for filling and capping milk bottles it is usual to provide an apparatus for making the bottle caps, for example from aluminium foil, simultaneously with the application and sealing of the caps to the bottles. The formed caps are generally fed down a chute to a position in the bottle filling and capping machine at which a cap is applied to a filled bottle, whereafter the bottle is advanced to a sealing position and the cap firmly sealed around the bottle neck. It will be appreciated that the caps must be produced at the same average rate as they are applied to the bottles, otherwise, on the one hand, there will be insufficient caps to feed to the bottles or, on the other hand, there will be a build-up of caps in the chute which will finally result in jamming of the cap-forming press with possible damage to the cap-forming tools.

The present invention has for its object to provide a cap-forming apparatus and control mechanism therefore which enables the caps to be produced at the correct average rate.

To this end, according to the invention, there is associated with the cap chute a detecting device for controlling the starting and stopping of the cap-forming apparatus which is arranged to produce caps at a speed slightly faster than the speed at which they are consumed by the capping machine, said detecting device starting the cap-forming apparatus through a time delay circuit or mechanism when the caps in the chute fall below a predetermined level, and stopping the cap-forming apparatus when sufficient caps have been produced again to raise the level of the caps in the chute to the predetermined level. The detecting device may also control the stopping of the cap-forming apparatus through a time delay circuit or mechanism, although this is not essential.

According to one embodiment of the invention, the detecting device comprises a photo-electric cell or the like which is illuminated by a beam of light projected through apertures in the cap chute, whereby when sufficient caps are in the chute the light beam will be interrupted and the photo-electric cell operated to switch off the cap-forming apparatus, either by stopping its driving motor or disengaging a clutch. The level of the caps in the chute will then immediately fall, due to their being consumed in the bottle capping machine, whereupon the photo-electric cell will again become illuminated and cause the cap-forming apparatus to start, either by switching in its motor or re-engaging the clutch. However, according to the invention the photo-electric cell controls the re-starting of the cap-forming apparatus through a time delay circuit or mechanism whereby the level of the caps in the chute will have fallen well below the light beam before the cap-forming apparatus again re-starts. By the provision of this time delay arrangement, the switching on and off of the cap-forming apparatus only takes place at relatively long intervals of time, thereby avoiding wear on the controlling mechanism.

The duration of the time delay introduced will depend upon the length of the chute between its discharge end and the light beam, and is so arranged that all the caps in the chute will not be consumed before the cap-forming press is again switched on. Thus, for example, if the bottle-capping machine is operating at the rate of 3,600 per hour, a time delay of 5–10 seconds will mean that 5–10 caps will be removed from the chute before the press is again switched on, and these 5–10 caps will have to build-up in the chute before the light beam is again interrupted and the press is switched off. Assuming that the press produces caps at a rate 5% faster than they are consumed it will take, in the example quoted, from approximately 1½ minutes to approximately 3 minutes before the desired build-up is achieved and the press is again switched off and again switched on after the time delay interval.

If desired, the switching off of the press motor may be controlled through a time delay circuit or device after the light beam has been interrupted, but in this case the time delay has to be relatively long if any appreciable advantage is to be achieved; for example, if the time delay were approximately 1½ minutes there would be a build-up of a further 5 caps in the chute before the motor were switched off and it would only be 5 seconds before this build-up of 5 caps were consumed by the capping machine and the photo-electric cell again energised, to re-start the press after the further predetermined time delay of 5–10 seconds.

It will be understood that the apparatus should be so designed that a cap falling through the light beam will not actuate the photo-electric cell to switch off the cap-forming apparatus until the required build-up of caps in the chute has been obtained. This may be achieved by an appropriate time delay device or by making the light beam of sufficiently large cross-section that it will not be entirely obscured by a single cap, the photo-cell remaining energised until the beam is completely obscured or is interrupted by more than one cap.

In accordance with a second feature of the invention, there is provided a control arrangement for cap-forming apparatus of the kind described comprising a detecting device associated with the cap-delivery chute which is arranged to stop the cap-forming apparatus in the event that the latter, when operating, is not feeding caps to the chute.

Preferably, the detecting device is also arranged to carry out the operation as described in the first feature of the invention.

The fact that caps are not being fed to the chute may be due to jamming in the cap-forming apparatus and the detecting device thus operated to protect the cap-forming apparatus from being damaged by continuing to operate.

In applying the invention to apparatus as previously described and employing a photo-electric cell as the detecting device, the cell is associated with a circuit such that when the cap-forming apparatus starts, after the predetermined time delay after the level of the caps has fallen below the light beam, the apparatus will only continue operating so long as the time interval between the delivery of successive caps is not substantially greater than normal. The circuit controlled by the photo-electric cell is such that so long as the light beam is periodically interrupted by the formed caps falling therepast at the normal periodicity, the cut-out controlling the motor or clutch of the cap-forming apparatus remains in, but if this time interval substantially increases, the cut-out switches off the motor.

This aspect of the invention may be carried into effect by arranging the photo-electric cell in a balanced circuit so that the cap-forming apparatus will only be driven when the average cell illumination is at an intermediate value, the cut-out operating to stop the cap-forming value, both when the cell is in complete darkness and when the cut-out operating to stop the cap-forming apparatus its average illumination is too high. Alternatively, the starting of the cap-forming apparatus may cause the circuit controlled by the photo-electric cell to be switched over so that an increase in the average illumination of the cell, above the predetermined value, will cause the apparatus to stop.

Advantageously, however, the detecting device is arranged initially to operate a first time-delay device comprising a thermionic tube having a capacitance in its grid circuit arranged to charge a further capacitance shunting a relay in its cathode circuit in such a manner that normal interruption of the beam of light playing on the photo-electric cell by caps passing down the delivery chute, is insufficient to de-energize the relay but when no output is obtainable from the cell upon substantially complete interruption of the beam, the current supplied to the relay by the further capacitance discharges away whereupon the relay falls out to stop a motor or motors of the cap-forming apparatus.

Preferably, in this advantageous arrangement, the initial operation of the first time-delay tube switches in a second time-delay tube also comprising a thermionic tube having a capacitance in its grid circuit and arranged to charge a further capacitance shunting a relay in its cathode circuit arranged and adapted to operate in such a manner that when no caps are being passed down the chute by the cap-forming apparatus and the beam to the photo-electric cell is completely uninterrupted, contacts associated with the relay in said second circuit are caused to open to switch-off or interrupt the supply of current to a motor or motors of the cap-forming apparatus.

In order that the invention may be more clearly understood, reference will now be made to the accompanying drawings which show, by way of example, two specific embodiments thereof and in which Fig. 1 shows a schematic layout of a first embodiment, particularly as applied to cap-forming machines having two motors, and Fig. 2 shows a diagrammatic layout of a second embodiment also as applied to machines having two motors.

Referring to Fig. 1 of the drawings, 1 indicates a cap-delivery chute down which caps 2 are caused to travel from a suitable cap-forming machine (not illustrated). One purpose of the invention is to prevent clogging and consequent jamming of the machine to which end a detecting device is used to indicate the presence of too many caps in the delivery chute 1. In this particular embodiment, the detecting device comprises a photo-electric cell associated with a suitable light source. The delivery chute 1 is, therefore, provided with aligned apertures 3 through which the light from a lamp 4 is caused to pass so as to be received upon the photo-cathode 5 of a photo-electric cell 6 whose anode is indicated at 7. Current supply to the cathode and anode is by way of the pins 8 and 9 respectively, and current to the lamp is conveyed by means of leads 10 and 11.

A relay coil having two sets of "make" contacts 13 and 14 is wired as a contactor operated in the usual manner by means of "start" and "stop" buttons 15 and 16 respectively. When the start button 15 is pressed this contactor passes current from a supply source, indicated generally at 17, on to a step-down transformer 18 whose secondary winding 19 supplies a low voltage to the lamp 4 that is used in conjunction with the cell 6. This actuation also supplies current from the source 17 to a photo-electric relay unit 20 to which the remote photo-electric cell 4 is connected by means of the leads 21 and 22. The photo-electric relay 20 is provided with a set of terminals A—D and when the photo-electric cell 6 is illuminated, the relay contacts between the terminals C and D of the relay unit 20 are closed. These contacts C and D are wired in such a manner that in this condition the coil 23 of a time-delay relay 24 is energized. After a time delay of from 5–10 seconds for example, the time-delay relay contacts 24a and 24b close and energize the coils 25 and 26 of a motor contactor of the magnetic type. The contactors are shown at 25a, 25b and 25c for one motor and at 26a, 26b and 26c for the other motor of the cap-forming machine. The motors, indicated generally at 27 and 28, are thus switched on and the machine commences to make caps. If these caps, after passage down the delivery chute 1 are not removed from the chute or if they are being delivered at a rate faster than that at which they are being removed, the level of the caps will commence to rise in the chute until such time as they fill or partly fill the slot 3 in the chute. This will interrupt the beam of light from the lamp 4 until there is no sensible output from the photo-electric cell 6, whereupon the contacts between terminals C and D, referred to above, open thus de-energizing the motor contacts 25a–c and 26a–c. The machine is thus stopped and no further caps are made until the level in the chute drops to reconstitute the beam from the lamp 4 on to the cell 5 and the cycle of operations is repeated.

A further push-button 29 is wired across the contacts 24a and 24b of the time-delay relay 24 and by operation of this button it is possible to operate the machine to exclude the photo-electric control circuit.

The supply circuit to the arrangement is shown as three-phase in which the lines are indicated by L, N, $L_1$, $L_2$ and $L_3$ but it will be obvious that it is not necessary for the supply to be three-phase and single-phase operation could be effected. In the use of the invention on single-phase circuits, it will be understood that lines $L_2$ and the wires to contactors 25b and 26b will be omitted, line $L_1$ will be strapped to L and line $L_3$ will be strapped to N.

In order to assist in the usefulness of the apparatus, the motors 27 and 28 may be individually operated by press switches 30 and 31 and indicator lamps 32, 33 may be connected in circuit with the switches to indicate which of the motors is in operation.

A central indicator 34 may be provided to indicate that current is being passed to the photo-electric cell lamp 4 since it will be appreciated that the photo-electric cell and lamp forming a unit may be at a remote location from the remainder of the apparatus.

It should also be understood that although the invention has been described in connection with cap forming machinery having two motors, it is equally applicable to machinery having only one motor.

Referring now to Fig. 2 which shows a second embodiment of the invention, parts having the same or very similar function bear the same reference numerals as Fig. 1. The photo-electric cell relay 20 is provided with terminals A, B, C and D similarly to Fig. 1 and the contacts C, D thereof are arranged to close when the photoelectric cell 6 is energized by a beam of light. In this particular embodiment, as each individual cap 2 interrupts the light beam through the slot 3 in its passage down the delivery chute 1, the contacts C open momentarily; these contacts are arranged in series with the supply voltage, again indicated at 17, and the electronic timing circuits indicated generally at 35. A first electronic timing circuit comprises a thermionic triode valve 36 having a cathode 37, a grid 38 and an anode 39, with a relay 40 in the cathode circuit and a capacitance 41 and resistance 41a (constituting a charging circuit), connected to the grid 38. When the contacts C of the relay 20 close on illumination of the cell 6 by a beam of light, and connect the alternating supply voltage to the anode 39, pulses of current flow through the valve 36 during the positive half-cycles of the supply voltage. The average value of these pulses of current increases as the capacitance 41 in the grid circuit becomes charged but when the average current reaches a predetermined value, two pairs of contacts 42 and 43 associated with the relay 40 close. One of these pairs of contacts 43 is wired to contactor coils 25 and 26 having contactors 25a to 25c and 26a to 26c respectively through selector switches 30 and 31 provided with indicator lamps 32, 33, as in the embodiment described in connection with Fig. 1. The motor 27 or 28 which has been selected, starts running and the machine commences to supply caps to the chute 1. As each cap interrupts the light beam, the contacts C are opened momentarily and the supply to the first timing circuit is thus momentarily broken but the contacts 42, 43 in the circuit will remain closed because the relay 40 is shunted by a high value condenser 44 which is charged by the triode valve 36 and itself discharges through a resistance 40a to the relay coil 40 during the brief time that the current supply is interrupted and so maintains the relay armature closed.

In this way, the interruptions of the light beam as each cap passes down the chute are prevented from causing corresponding interruptions in the supply to the motors 27 and 28.

If the caps are being delivered to the chute 1 and are not being removed, or if they are being delivered at a rate faster than that at which they are being removed, the level in the delivery chute will rise until the beam of light from the lamp 4 to the photo-electric cell 6 is interrupted. When complete interruption takes place so that there is no output from the photo-electric cell 6, the contacts C open and the supply is removed from the anode of the valve 35 so that it does not conduct and the shunting condenser 44 completely discharge through the resistance 40a and relay coil 40 so that the relay becomes de-energised, the contacts 42 to 43 open and the motors stop. No further caps are produced until the beam of light from the lamp 4 is again reconstituted.

The invention also incorporates a safety device for switching off the motors if they are switched on and the light beam is not being interrupted periodically as occurs during the normal operation of the machine. For example, if a mechanical fault should develop on the cap-forming tool unit occasioned by a jamming of the foil, the supply of caps would cease although the motor was still driving the machine. This safety device takes the form of an auxiliary timing circuit which is arranged to shut the motors off in these circumstances to prevent any further mechanical damage.

The auxiliary timing circuit comprises a thermionic valve 45 having a cathode 46, a grid 47 and an anode 48, with a relay 50 in the cathode circuit and a capacitance 49, resistance 49a (constituting a charging circuit), connected to the grid 47.

Assuming that the machine is running normally and that the light beam is being interrupted periodically by each cap passing down the chute 1, the contacts C will open momentarily as each cap passes and these contacts, as described before, connect the alternating supply to the first timing circuit comprising the tube 36. After the initial timing period when the average current will have reached a predetermined value, the relay 40 will have closed the contacts 42 and 43. The contacts 42 connect the momentarily interrupted supply to the second or auxiliary timing circuit containing the tube 45 and the current in the second relay coil 50 which is in the cathode circuit of the tube 45, starts to rise but before it can reach the closing value, the supply voltage is momentarily interruped by the passage of another cap. During this interruption the charging capacitance 44 discharges rapidly through the grid circuit and through a resistance 49a and a relay-shunting condenser 51, which is of a value smaller than the capacitance 49, the capacitance 51 also quickly discharges through the relay 50. Thus, in normal operation of the apparatus, provided that the interruptions in the supply are regular, the relay coil 50 never becomes fully energised because the capacitance 49 discharges through the valve 45 but if a cap should jam in the cap-forming machine there will be no further interruptions in the light beam because there are no caps passing down the chute 1 and consequently the current in the second or auxiliary timing circuit containing the tube 45 can attain the value necessary to close the relay 50. When this comes about, the contacts 52 associated with the relay 50 are opened and since these are wired as shown in series with a stop button 16 controlling the main relay 12, the whole machine is rendered inoperative.

A step-down transformer 53 has a separate winding 54 for each of the tubes 36 and 45 and it also has a further winding 55 to supply the lamp 4 of the photo-cell unit, the indicator lamps 32 and 33 and any other devices required to be operated by low voltage.

In this embodiment, the main relay 12 is controlled in the same manner as shown in Figure 1 by means of start and stop buttons 15 and 16, its purpose being to connect the supply to the timing units and the photo-electric relay unit 20 when the start button 15 is pressed.

It should be understood that although electronic timing circuits have been shown in this specific embodiment, other convenient timing units could be used if desired, for example, timers controlled by magnetic dash-pots.

I claim:

1. In combination with the cap-delivery chute of a bottle-cap-forming apparatus having an electric driving motor, an electrical control device associated with said cap-delivery chute, means associated with said control device to arrange to stop said driving motor and thus said cap-forming apparatus in the event that said cap-forming apparatus, when operating, is not feeding caps to said chute, a circuit including said driving motor associated with said control device, a cut-out in said circuit a first time-delay device comprising a thermionic tube having a capacitance in its grid circuit arranged to charge a further capacitance shunting a relay in its cathode circuit, and means for causing said control device to initially operate said first time-delay device so that normal interruption of the beam of light playing on the photo-electric cell by caps passing down the delivery chute is insufficient to de-energise said relay but when no output is obtainable from said cell upon substantially complete interruption of the beam, the current supplied to said relay by said further capacitance discharges away whereupon said relay falls out to energise said cut out to stop the said driving motor of said cap-forming apparatus.

2. In combination with the cap-delivery chute of a bottle-cap-forming apparatus having an electric driving motor, an electrical control device associated with said cap-delivery chute, means associated with said control device to arrange to stop said driving motor and thus said cap-forming apparatus in the event that said cap-forming apparatus, when operating, is not feeding caps to said chute, a circuit including said driving motor associated with said control device, a cut-out in said circuit a first time-delay device comprising a thermionic tube having a capacitance in its grid circuit arranged to charge a further capacitance shunting a relay in its cathode circuit, means for causing said control device to initially operate said first time-delay device so that normal interruption of the beam of light playing on the photo-electric cell by caps passing down the delivery chute is insufficient to de-energise said relay but when no output is obtainable from said cell upon substantially complete interruption of the beam, the current supplied to said relay by said further capacitance discharges away whereupon said relay falls out to energise said cut out to stop the said driving motor of said cap-forming apparatus, and a second time-delay tube also comprising a thermionic tube having a capacitance in its grid circuit and arranged to charge a further capacitance shunting a relay in its cathode circuit, initial operation of said first time-delay tube switching in said second time-delay tube so that when no caps are being passed down said delivery chute by said cap-forming apparatus and the beam in the photo-electric cell is completely uninterrupted, contacts associated with said relay in said second circuit are caused to open to switch off or interrupt the supply of current to said driving motor of said cap-forming machine.

3. In combination with a cap delivery chute of a bottle cap-forming apparatus, from which chute caps are expended, control means to control the operation of said cap-forming apparatus when the level of caps in said chute differs from a predetermined level, comprising an electrical cap-level detector device associated with said chute at said predetermined level, a motor for said cap-forming apparatus, a time delay device having contacts arranged to close after a predetermined time after energisation of the time delay device, electrically connected between said detector device and said motor for energisation by said detector device, so that when the level of caps in said chute falls below said predetermined level, said motor is operated after a predetermined time, said detector device also operating to control the stopping of said motor when the level of caps in said chute is above said predetermined level.

4. In combination with a cap delivery chute of a bottle cap-forming apparatus, from which chute caps are expended, control means to control the operation of said cap-forming apparatus when the level of caps in said chute differs from a predetermined level, comprising an electrical cap-level detector device associated with said chute at said predetermined level, a motor for said cap-forming apparatus, a time delay device having contacts arranged to close after a predetermined time after energisation of the time delay device, electrically connected between said detector device and said motor for energisation by said detector device, so that when the level of caps in said chute falls below said predetermined level, said motor is operated after a predetermined time, said detector device also being connected through said time delay device to control the stopping of said motor at a predetermined time after the level of caps in said chute is above said predetermined level.

5. In combination with a cap delivery chute of a bottle cap-forming apparatus, from which chute caps are expended, control means to control the operation of said cap-forming apparatus when the level of caps in said chute differs from a predetermined level, comprising an electrical cap-level detector device associated with said chute at said predetermined level, a motor for said cap-forming apparatus, a time delay device having contacts arranged to close after a predetermined time after energisation of the time delay device, electrically connected between said detector device and said motor for energisation by said detector device, so that when the level of caps in said chute falls below said predetermined level, said motor is operated after a time equivalent to the passage of a plurality of caps down said chute, said detector device also operating to control stopping of said motor when the level of caps in said chute is above said predetermined level.

6. In combination with a cap delivery chute of a bottle cap-forming apparatus, from which chute caps are expended, control means to control the operation of said cap-forming apparatus when the level of caps in said chute differs from a predetermined level, comprising an electrical cap-level detector device associated with said chute at said predetermined level, a motor for said cap-forming apparatus, a time delay device having contacts arranged to close after a predetermined time after energisation of the time delay device, electrically connected between said detector device and said motor for energisation by said detector device, so that when the level of caps in said chute falls below said predetermined level, said motor is operated after a time equivalent to the passage of a plurality of caps down said chute, said detector device also being connected through said time delay device to control the stopping of said motor at a predetermined time after the level of caps in said chute is above said predetermined level.

7. In combination with a cap delivery chute of a bottle cap-forming apparatus, from which chute caps are expended, control means to control the operation of said cap-forming apparatus when the level of caps in said chute differs from a predetermined level, comprising aligned apertures in the side walls of said chute at said predetermined level, a light source located to pass light through said aligned apertures, a photo-cell located on the reverse side of said chute to receive light from said light source, a motor for said cap-forming apparatus, a time delay device having contacts arranged to close after a predetermined time after energisation of the time delay device, electrically connected between said photo-cell and said motor for energisation by the said photo-cell, so as to control starting of said motor at a predetermined time after said caps have dropped below said predetermined level, said photo-cell also operating to control stopping of said motor when the level of caps in said chute is above said predetermined level.

8. In combination with a cap delivery chute of a bottle cap-forming apparatus, from which chute caps are expended, control means to control the operation of said cap-forming apparatus when the level of caps in said chute differs from a predetermined level, comprising aligned apertures in the side walls of said chute at said predetermined level, a light source located to pass light through said aligned apertures, a photo-cell located on the reverse side of said chute, to receive light from said light source, a motor for said cap-forming apparatus, a time delay device having contacts arranged to close after a predetermined time after energisation of the time delay device, electrically connected between said photo-cell and said motor for energisation by said photo-cell, so as to control starting of said motor at a time after said caps have dropped below said predetermined level equivalent to the passage of a plurality of caps down said chute, said photo-cell also operating to control stopping of said motor when the level of caps in said chute is above said predetermined level.

9. In combination with a cap delivery chute of a bottle cap-forming apparatus from which chute caps are expended, control means to control the operation of said cap-forming apparatus when the level of caps in said chute differs from a predetermined level, comprising aligned apertures in the side walls of said chute at said predetermined level, a light source located to pass light through said aligned apertures, a photo-cell located on the reverse side of said chute, to receive light from said light source, a motor for said cap-forming apparatus, a time delay device having contacts arranged to close after a predetermined time after energisation of the time delay device, electrically connected between said photo-cell and said motor for energisation by said photo-cell, so as to control starting of said motor at a time after said caps have dropped below said predetermined level equivalent to the passage of a plurality of caps down said chute, said photo-cell also being connected to control stopping of said motor when the level of caps in said chute is above said predetermined level and to control stopping of said motor in the event that no caps are passing down said chute when said motor is operating.

10. In combination with the cap-delivery chute of a bottle-cap-forming apparatus having an electric driving motor, an electrical control device associated with said cap-delivery chute, and sensitive to the level of bottle caps in said chute, an electric circuit including said driving motor and said control device, a cut-out in said circuit, means for causing said control device to energise said cut-out to switch off said motor when the rate at which the formed caps travel down said delivery chute substantially increases, and means for causing said control device to switch off said motor when no caps travel down said chute during running of said motor.

11. In combination with a bottle cap-forming apparatus having an electric driving motor, a delivery chute down which the caps formed by said apertures are allowed to travel under the influence of gravity, apertures in said chute, a photo-electric cell and a light source on opposite sides of said cap delivery chute and in line with said apertures, an electric circuit including said driving motor and said control device, a cut-out in said circuit, means for causing said control device to energise said cut-out to switch off said motor when the rate at which the formed caps travel down said delivery chute substantially increases, and means for causing said control device to switch off said motor when no caps travel down said chute during running of said motor.

12. An arrangement as claimed in claim 11, in which said circuit includes a balanced circuit portion in which said photo-electric cell is connected, said balanced circuit portion being responsive to an average illumination of said photo-electric cell so that said cap-forming apparatus is only driven when the said average illumination is at an intermediate value.

13. In combination with a bottle cap-forming apparatus driven by an electric motor, a delivery chute down which the caps formed by said apparatus are caused to travel under the influence of gravity, apertures in said chute, a photo-electric cell and a light source on opposite sides of said cap delivery chute and in line with said apertures, an electric circuit including said photo-electric cell and said driving motor, a cut-out in said circuit, a time delay thermionic tube in said circuit and having a capacitance in its grid circuit and arranged to charge a further capacitance shunting a relay in its cathode circuit, means for switching in said time delay tube when no caps are being passed down said delivery chute by said cap-forming apparatus and the beam to the photo-electric cell is completely uninterrupted, contacts associated with said relay being caused to open to switch off the supply of current to said driving motor of said cap-forming machine in the given condition that no caps are being passed down said delivery chute.

References Cited in the file of this patent

UNITED STATES PATENTS

| | | |
|---|---|---|
| 1,725,602 | Stephens | Aug. 20, 1929 |
| 2,053,763 | Brinton | Sept. 8, 1936 |
| 2,061,589 | Philp | Nov. 24, 1936 |
| 2,337,132 | Shaw | Dec. 21, 1943 |
| 2,337,667 | Kuehlman | Dec. 28, 1943 |
| 2,381,505 | Lindholm | Aug. 7, 1945 |
| 2,416,595 | Reynolds | Feb. 25, 1947 |
| 2,609,779 | Goldsworthy | Sept. 9, 1952 |